United States Patent
Jung et al.

(10) Patent No.: US 7,508,891 B2
(45) Date of Patent: Mar. 24, 2009

(54) METHOD FOR FEEDING BACK ANTENNA SHUFFLING INFORMATION IN A MULTIPLE-INPUT MULTIPLE-OUTPUT SYSTEM USING A MULTIPLE SPACE-TIME BLOCK CODING TECHNIQUE

(75) Inventors: Young-Ho Jung, Yongin-si (KR); Seung-Hoon Nam, Seoul (KR); Yong-Hoon Lee, Daejeon (KR); Jin-Gon Joung, Seoul (KR); Woo-Seok Nam, Busan (KR); Woo-Hyuk Chang, Gyeongsan-si (KR)

(73) Assignees: Samsung Electronics Co., Ltd. (KR); Korea Advanced Institute of Technology (KAIST) (KR)

( * ) Notice: Subject to any disclaimer, the term of this patent is extended or adjusted under 35 U.S.C. 154(b) by 649 days.

(21) Appl. No.: 11/181,147

(22) Filed: Jul. 14, 2005

(65) Prior Publication Data

US 2006/0018415 A1    Jan. 26, 2006

(30) Foreign Application Priority Data

Jul. 20, 2004    (KR) ...................... 10-2004-0056304

(51) Int. Cl.
*H04B 7/10*    (2006.01)
*H04B 1/00*    (2006.01)
(52) U.S. Cl. ........................ 375/347; 375/148
(58) Field of Classification Search ................. 375/347, 375/148
See application file for complete search history.

(56) References Cited

U.S. PATENT DOCUMENTS

| | | | |
|---|---|---|---|
| 6,980,600 B1 * | 12/2005 | Ratnarajah | 375/260 |
| 7,068,981 B2 * | 6/2006 | Sim | 455/101 |
| 7,209,522 B1 * | 4/2007 | Shirali | 375/285 |
| 7,298,717 B2 * | 11/2007 | Hui et al. | 370/329 |
| 7,324,583 B2 * | 1/2008 | Hooli et al. | 375/148 |
| 7,349,496 B2 * | 3/2008 | Jia et al. | 375/341 |
| 2003/0003863 A1 * | 1/2003 | Thielecke et al. | 455/39 |
| 2003/0185310 A1 | 10/2003 | Ketchum et al. | |
| 2004/0190603 A1 * | 9/2004 | Dabak et al. | 375/148 |
| 2006/0045200 A1 * | 3/2006 | Bocquet | 375/267 |
| 2006/0088006 A1 * | 4/2006 | Chimitt | 370/332 |
| 2007/0223367 A1 * | 9/2007 | Wu et al. | 370/216 |

OTHER PUBLICATIONS

Texas Instruments, Improved Double-STTD schemes using asymmetric modulation and antenna shuffling, May 21-25, 2001, Busan, Korea, TSG-RAN working group 1.*

(Continued)

*Primary Examiner*—David C Payne
*Assistant Examiner*—Tanmay K Shah
(74) *Attorney, Agent, or Firm*—The Farrell Law Firm, P.C.

(57) ABSTRACT

In a method for feeding back combination information of transmitted signals in a multiple-input multiple-output (MIMO) system using a multiple space-time block coding technique, mean square error values are computed in relation to the combination information pieces of the transmitted signals. An index of a combination having a minimum mean square error value from among the mean square error values is fed back.

14 Claims, 4 Drawing Sheets

OTHER PUBLICATIONS

Wubben Dirk; Bohnke, Ronald; Kuhn,Volker; Kammeyer, Karl-Dirk; MMSE extension of V-BLAST based on sorted QR decomposition, 2003 IEEE, Berman, Germany.*

Texas Instruments, Improved Double-STTD Schemes Using Asymmetric Modulation and Antenna Shuffling, TSG-RAN Working Group 1 Meeting #20, 2001.

Narayan Prasad et al., "Optimum Efficiently Decodable Layered Space-Time Block Codes", 2001.

Eko N. Onggosanusi et al., "High Rate Space-Time Block Coded Scheme: Performance and Improvement in Correlated Fading Channels", 2002 IEEE.

* cited by examiner

METHOD FOR FEEDING BACK ANTENNA SHUFFLING INFORMATION IN A MULTIPLE-INPUT MULTIPLE-OUTPUT SYSTEM USING A MULTIPLE SPACE-TIME BLOCK CODING TECHNIQUE

PRIORITY

This application claims priority to an application entitled "METHOD FOR FEEDING BACK ANTENNA SHUFFLING INFORMATION IN A MULTIPLE-INPUT MULTIPLE-OUTPUT SYSTEM USING A MULTIPLE SPACE-TIME BLOCK CODING TECHNIQUE", filed in the Korean Intellectual Property Office on Jul. 20, 2004 and assigned Serial No. 2004-56304, the entire contents of which are incorporated herein by reference.

BACKGROUND OF THE INVENTION

1. Field of the Invention

The present invention relates generally to a multiple-input multiple-output (MIMO) system, and more particularly to a method for feeding back antenna shuffling information in a MIMO system using a layered space-time block coding technique or double space-time transmit diversity (DSTTD) technique.

2. Description of the Related Art

A large amount of research is being conducted in the field of wireless mobile communication systems for providing multimedia service in which high-quality, high-speed, and high-capacity data can be transmitted. Wireless channel environments of wireless mobile communication systems are different from wired channel environments, and receive, in practice, a distorted transmitted signal due to various factors such as multipath interference, shadowing, radio wave attenuation, and time-varying noise and interference. Fading due to the multipath interference is closely associated with a reflecting object or user, and the mobility of a user terminal. When the fading due to the multipath interference occurs, a signal composed of a real transmitted signal mixed with an interference signal is received. The received signal is seriously distorted from the originally transmitted signal, such that overall performance of the mobile communication system is degraded. Because the effect of fading can distort the amplitude and the phase of the received signal, it is an important factor that interferes with high-speed data communications in the wireless channel environment. A large amount of research is currently being conducted to prevent the fading effect. To transmit data at high speed, the mobile communication system must minimize the loss and any user-by-user interference according to the characteristics of a mobile communication channel. To compensate the loss and overcome the interference, many multiple-input multiple-output (MIMO) techniques have been proposed.

The MIMO technology can be divided into various categories of techniques according to the data transmission method used and the presence of channel information feedback.

The MIMO technology is divided into categories such as spatial multiplexing (SM) and spatial diversity (SD) techniques according to the data transmission method. The SM technique simultaneously transmits different pieces of data using multiple antennas at a transmitting terminal and a receiving terminal, thereby transmitting data at high speed without increasing the system bandwidth. The SD technique transmits identical data by means of multiple transmit (Tx) antennas or transmit symbol times, thereby obtaining transmission diversity.

The MIMO technology is further divided into categories such as open and closed loop techniques according to the presence of channel information feedback in the receiving terminal.

The closed loop technique is a singular value decomposition (SVD) technique. The SVD technique can theoretically obtain optimal performance, but has a disadvantage in that the number of computations increases because the receiving terminal must feed back all of the channel values to the transmitting terminal.

The open loop technique is divided into categories such as space-time block coding (STBC), Bell Labs layered space-time (BLAST) and layered STBC (L-STBC) techniques according to the data transmission method. The STBC technique has been proposed to support a Tx antenna diversity function. However, when the number of Tx antennas increases, diversity gain decreases. According to the BLAST technique, a data rate is high, but performance is degraded because a diversity gain is absent. In the BLAST technique, the number of receive (Rx) antennas must be greater than or equal to the number of Tx antennas. To overcome the disadvantages of the STBC and BLAST techniques, the L-STBC technique has been proposed. The L-STBC technique is a combination of both the STBC and BLAST techniques, and improves the diversity gain and the data rate as compared with both the STBC and BLAST techniques, and obtains both of the diversity gain and multiplexing gain.

The structure of a conventional MIMO communication system will be described with reference to FIGS. 1 and 2.

FIG. 1 relates to an article by: N. Prasad and M. Varanasi, entitled "Optimum Efficiently Decodable Layered Space-Time Block Codes", *Signals, Systems and Computers,* 2001. *Conference Record of the Thirty-Fifth Asilomar Conference,* vol. 1, pp. 227-231, 2001. FIG. 2 relates to an article by: E. N. Onggosanusi, A. G. Dabak, and T. M. Schmidl, entitled "High Rate Space-Time Block Coded Scheme: Performance and Improvement in Correlated Fading Channels", *WCNC 2002—IEEE Wireless Communications and Networking Conference,* vol. 3, no. 1, March 2002, pp. 161-166.

FIG. 1 is a block diagram illustrating a conventional L-STBC system.

Referring to FIG. 1, a transmission and reception system using the L-STBC technique has an open loop structure. That is, the receiving terminal does not feed back channel information to the transmitting terminal, and the transmitting terminal does not identify channel information. Accordingly, the transmitting terminal does not perform adaptive modulation according to a channel state. Because the receiving terminal must sequentially eliminate noise components from the signals transmitted from the transmitting terminal, complexity increases due to frequent iteration.

FIG. 2 is a block diagram illustrating a conventional system using double space-time transmit diversity (DSTTD) technique for feeding back a weighting matrix.

Referring to FIG. 2, the conventional DSTTD system has a closed loop structure for feeding back a weighting matrix from the receiving terminal to the transmitting terminal. The transmitting terminal receiving the weighting matrix multiplies an STBC signal by a weighting value and transmits the STBC signal multiplied by the weighting value to the receiving terminal, such that STBC diversity performance can be obtained from a correlated channel. However, the number of computations required to obtain an optimal weighting matrix is very large. The calculation of the weighting matrix imposes a heavy burden on the receiving terminal in FDD system. Accordingly, the receiving terminal just intermittently feed back information of the weighting matrix.

However, the amount of information of the weighting matrix fed back from the receiving terminal is also a heavy burden. Accordingly, the DSTTD system replaces the weighting matrix with a permutation matrix and uses antenna shuffling in an assumed independent, identically distributed (i. i. d.) channel environment. However, a weighting matrix optimal to a correlated channel does not have an equation to approximate the closed loop structure. The weighting matrix fed back by the receiving terminal in FIG. 2, which is initially set up at the transmitting terminal, is a result value produced by many simulations.

SUMMARY OF THE INVENTION

The conventional MIMO system that does not feed back channel information from the receiving terminal to the transmitting terminal is problematic in that the transmitting terminal does not use an adaptive modulation scheme because it does not identify the channel information, and complexity of the receiving terminal increases when a signal is decoded. Moreover, the conventional MIMO system that feeds back a weighting matrix is inappropriate to correlated channel applications because a weighting matrix produced by simple simulations is used.

Accordingly, the present invention has been designed to solve at least the above and other problems occurring in the prior art. Therefore, it is an object of the present invention to provide a method for improving channel performance in a multiple-input multiple-output (MIMO) system using a layered space-time block coding (L-STBC) technique.

It is another object of the present invention to provide a method for feeding back channel information in a multiple-input multiple-output (MIMO) system using a layered space-time block coding (L-STBC) technique.

In accordance with an aspect of the present invention, the above and other objects can be accomplished by a method for feeding back combination information of transmitted signals in a multiple-input multiple-output (MIMO) system using a layered space-time block coding (L-STBC) technique. The method includes computing mean square error values in relation to combination information pieces of the transmitted signals; and feeding back an index of a combination having a minimum mean square error value from among the mean square error values.

In accordance with another aspect of the present invention, the above and other objects can be accomplished by a method for transmitting signals in a multiple-input multiple-output (MIMO) system using a layered space-time block coding (L-STBC) technique. The method includes receiving a combination index of transmitted signals from a receiving terminal; combining signals to be transmitted according to the combination index and assigning the combined signals to antennas; and transmitting the assigned signals to the receiving terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will now be described in detail herein below with reference to the accompanying drawings. In the following description, a detailed description of known functions and configurations incorporated herein will be omitted for conciseness.

The present invention proposes a method for feeding back channel information from a receiving terminal to a transmitting terminal in a multiple-input multiple-output (MIMO) system (actually, the present invention does not dependent on the receiving technique, not transmitting technique, that is multiple space-time block coding system). More specifically, the conventional MIMO system using the L-STBC technique does not feed back channel information from the receiving terminal to the transmitting terminal. However, the receiving terminal of the present invention feeds back channel information (i.e., shuffling information of transmit (Tx) antennas) such that a mean square error (MSE) of a received signal is minimized, thereby improving performance. The combination information of the transmitted signals fed back from the receiving terminal received by the transmitting terminal is referred to as antenna shuffling information.

(1) Method for Acquiring Antenna Shuffling Information in the L-STBC-Based Receiving Terminal A 4×2 L-STBC MIMO system in accordance with an embodiment of the present invention will be described with reference to FIG. 3.

Figure 3:
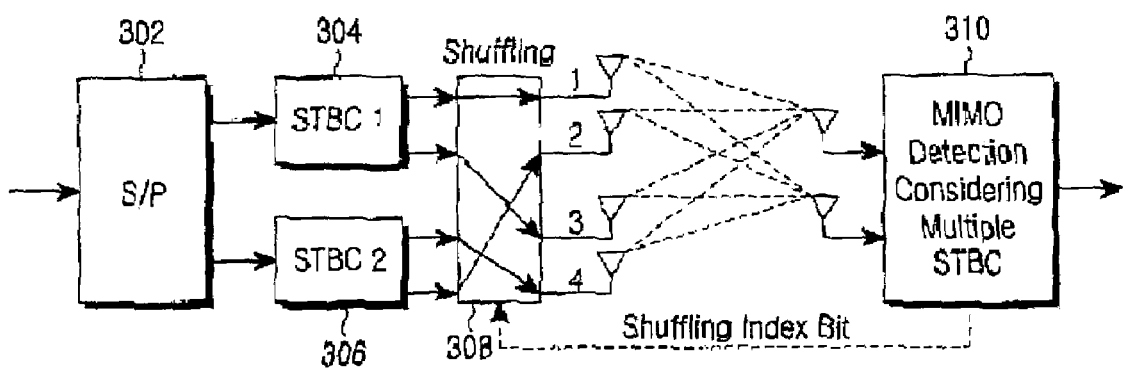
FIG. 3 is a block diagram illustrating a 4×2 L-STBC multiple-input multiple-output (MIMO) system in accordance with an embodiment of the present invention.

FIG. 3 is a block diagram illustrating the 4×2 L-STBC MIMO system in accordance with the embodiment of the present invention.

When the transmitting terminal has T Tx antennas, and uses B Tx antennas of the T Tx antennas for STBC, the transmitting terminal conventionally performs spatial multiplexing into T/B (=L) layer signals to transmit a result of the multiplexing. The receiving terminal must have L or more receive antennas, and can detect each layer signal by means of a Bell Labs layered space-time (BLAST) technique. Therefore, the present invention can be applied to any MIMO system using T×L transmit/receive antennas with multiple space-time block coding. However, for convenience of explanation, a 4×2 MIMO system in accordance with a preferred embodiment of the present invention will be described.

Figure 4:
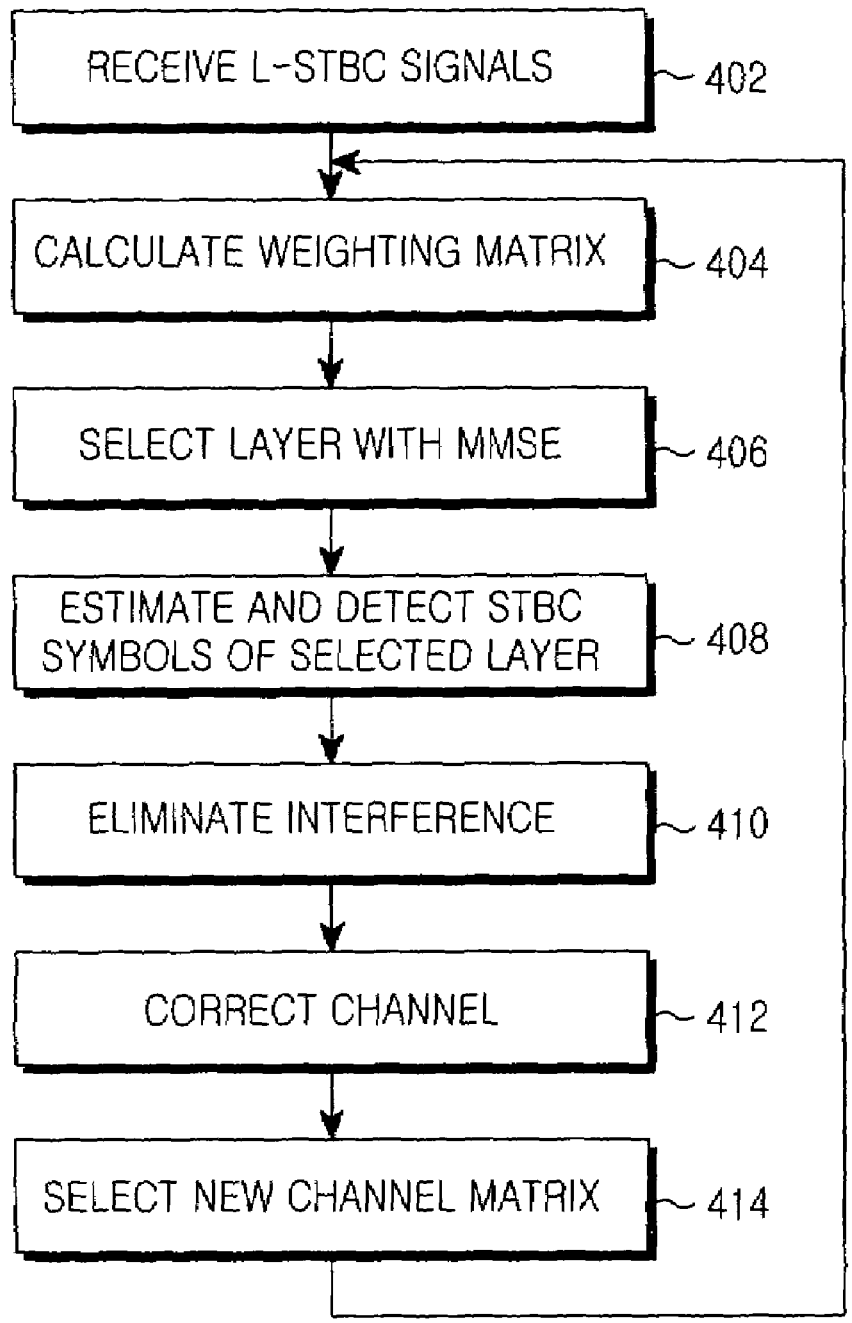
FIG. 4 is a flow chart illustrating a shuffling information acquisition process performed by a receiving terminal of the L-STBC system in accordance with an embodiment of the present invention.

Referring to FIGS. 3 and 4, the L-STBC MIMO and double space-time transmit diversity (DSTTD) system, respectively, in accordance with an embodiment of the present invention converts a serial signal to be transmitted to the receiving terminal into parallel signals by means of a serial-to-parallel (S/P) converter 302, and outputs the parallel signals to an STBC-1 unit 304 and an STBC-2 unit 306 for signal modulation. The STBC-1 unit 304 performs an STBC operation on signals $x_1(2n)$ and $x_1(2n+1)$ at a time t=2n and a time t=2n+1. The STBC-2 unit 306 performs an STBC operation on signals $x_2(2n)$ and $x_2(2n+1)$ at a time t=2n and a time t=2n+1. The signals $x_1(2n)$, $x_1(2n+1)$, $x_2(2n)$, and $x_2(2n+1)$ are output to four Tx antennas. When the transmitting terminal stores the shuffling index information received from the receiving terminal, it assigns the transmission signals corresponding to the shuffling index information to the Tx antennas and transmits the signals to the receiving terminal. However, because the shuffling index information is absent when initial signals are transmitted, a shuffling unit 308 passes the signals to be transmitted regardless of the shuffling index information.

The signals $x_1(2n)$, $x_1(2n+1)$, $x_2(2n)$, and $x_2(2n+1)$ received by two receive (Rx) antennas of the receiving terminal can be expressed by the following Equations 1 and 2.

$$Y' = Hx' + v' \quad (1)$$

$$\begin{bmatrix} y_1(2n) & y_1(2n+1) \\ y_2(2n) & y_2(2n+1) \end{bmatrix} =$$

$$\begin{bmatrix} h_{1,1} & h_{1,2} & h_{1,3} & h_{1,4} \\ h_{2,1} & h_{2,2} & h_{2,3} & h_{2,4} \end{bmatrix} \begin{bmatrix} x_1(2n) & -x_1^*(2n+1) \\ x_1(2n+1) & x_1^*(2n) \\ x_2(2n) & -x_2^*(2n+1) \\ x_2(2n+1) & x_2^*(2n) \end{bmatrix} + v'$$

$$y = Sx + v \quad (2)$$

$$\begin{bmatrix} y_1(2n) \\ y_1^*(2n+1) \\ y_2(2n) \\ y_2^*(2n+1) \end{bmatrix} = \begin{bmatrix} h_{1,1} & h_{1,2} & h_{1,3} & h_{1,4} \\ h_{1,2}^* & -h_{1,1}^* & h_{1,4}^* & -h_{1,3}^* \\ h_{2,1} & h_{2,2} & h_{2,3} & h_{2,4} \\ h_{2,2}^* & -h_{2,1}^* & h_{2,4}^* & -h_{2,3}^* \end{bmatrix} \begin{bmatrix} x_1(2n) \\ x_1(2n+1) \\ x_2(2n) \\ x_2(2n+1) \end{bmatrix} + v$$

In the above Equations 1 and 2, $h_{i,j}$ is a channel gain value between a j-th Tx antenna and an i-th Rx antenna. $y=[y_1(2n) y^*_1(2n+1)y_2(2n)y^*_2(2n+1)]^T$ is a received signal. $x=[x_1(2n) x_1(2n+1)x_2(2n)x_2(2n+1)]^T$ is a transmitted signal. $v=[v_1(2n) v^*_1(2n+1)v_2(2n)v^*_2(2n+1)]^T$ is a noise vector. The elements of the vector v are normal noise components with a distribution of $N\sim(0,\sigma^2)$. $(\bullet)^*$ denotes complex conjugate and $(\bullet)^T$ denotes a transpose operation. In the above Equations 1 and 2, the signals $x_1(2n)$, $x_1(2n+1)$, $x_2(2n)$, and $x_2(2n+1)$ at a time t=2n and a time t=2n+1 are one STBC symbol, respectively. Because channels through which two STBC symbols pass are orthogonal to each other, the receiving terminal can perform a detection operation in unit of STBC symbols.

It is assumed that a channel matrix $S=[s_1\ s_2\ s_3\ s_4]$. A tab weighting matrix $G=[g_1,\ g_2\ g_3\ g_4]^H$ based on a vertical Bell Labs layered space-time (V-BLAST) detection process is given by the following Equation 3.

$$G_{ZF} = \{S^H S\}^{-1} S^H = [g_1 g_2 g_3 g_4]_{ZF}$$

$$G_{MMSE} = \{S^H S + \sigma^2 I\}^{-1} S^H = [g_1 g_2 g_3 g_4]_{MMSE} \quad (3)$$

In the above Equation 3, $\{\bullet\}^H$ denotes a Hermitian transpose. I denotes an T-dimensional identity matrix. ZF denotes zero forcing. MMSE denotes the minimum mean square error.

A mean square error (MSE) associated with a weighting vector is given by the following Equation 4.

$$\{\sigma_1^2 \sigma_2^2 \sigma_3^2 \sigma_4^2\}_{ZF} = diag\{(S^H S)^{-1}\}$$

$$\{\sigma_1^2 \sigma_2^2 \sigma_3^2 \sigma_4^2\}_{MMSE} = diag\{(S^H S + \sigma^2 I)^{-1}\} \quad (4)$$

In the above Equation 4, diag$\{\bullet\}$ denotes diagonal components of a matrix. Here, an MSE is obtained from the channel matrix S. Because of the orthogonality between STBC channels, MSE values of signals coded by the same STBC are identical. That is, $\sigma_1^2 = \sigma_2^2$ and $\sigma_3^2 = \sigma_4^2$. A set representing MSEs of the STBC signals is defined by $\lambda = \{\sigma_1^2, \sigma_3^2\} \cdot \sigma_1^2$ represents an MSE associated with the STBC-1 unit 304, and $\sigma_3^2$ represents an MSE associated with the STBC-2 unit 306. The order of the STBC layers 1 to be detected by the V-BLAST technique can be obtained from the following Equation 5.

$$\text{select } k_m = l \text{ s.t.} \quad (5)$$

$$\arg \min_l \{\lambda_l\}$$

Assuming that l is 2 in the above Equation 5, $k_1=2$. A signal of the STBC-1 unit 304 is first detected. In this case, an MSE is $\sigma_3^2$.

An STBC symbol of a selected layer is estimated by the following Equation 6.

$$\begin{bmatrix} \hat{x}_2(2n) \\ \hat{x}_2(2n+1) \end{bmatrix} = \text{decision}\left\{\begin{bmatrix} g_3^H \\ g_4^H \end{bmatrix} y\right\} \quad (6)$$

As illustrated in the following Equation 7, the interference is eliminated from a received signal using signals $\hat{x}_2(2n)$ and $\hat{x}_2(2n+1)$ detected by the above Equation 6.

$$y' = y - [s_3\ s_4]\begin{bmatrix} \hat{x}_2(2n) \\ \hat{x}_2(2n+1) \end{bmatrix} = [s_3\ s_4]\begin{bmatrix} \hat{x}_2(2n) \\ \hat{x}_2(2n+1) \end{bmatrix} + v'' \quad (7)$$

When the interference is eliminated from the received signal as illustrated in the above Equation 7, a channel value of a decided signal is set to a vector of 0 as illustrated in the following Equation 8.

$$S_{\bar{2}} = [s_1\ s_2] \quad (8)$$

In the above Equation 8, $S_{\bar{k}_m}$ is a channel matrix from which a channel of a $k_m$-th layer's STBC signal is eliminated for a (m+1)-th sequential detection. Here, the $k_m$-th layer's STBC signal is a signal detected in a previous $m\in\{0,1\ldots,L-1\}$-th sequential detection. An initial value $S_{\bar{k}_0}=S$. At this point, when the STBC signals are accurately detected, that is, $\hat{x}_2(2n)=x_2(2n)$ and $\hat{x}_2(2n+1)=x_2(2n+1)$, the above Equation 7 can be written as the following Equation 9.

$$y' = S_{\bar{2}}\begin{bmatrix} x_1(2n) \\ x_1(2n+1) \end{bmatrix} + v'' \quad (9)$$

Because $k_1=2$ in the above Equation 9, a new weighting matrix $S_{\bar{2}}=[s_1\ s_2]$ is obtained from a new channel matrix from which a channel of the second layer's signal is eliminated. A remaining STBC signal is estimated when the new weighting matrix is multiplied by y'. When an STBC-2 signal is detected, the MSE is different from $\sigma_1^2$ because the STBC signal must be estimated from a new signal model from which interference is eliminated in the above Equation 7. When a ZF scheme is used, $\{\sigma_5^6, \sigma_6^2\}_{ZF} = diag\{(S_{\bar{2}}^H S_{\bar{2}})^{-1}\}$. When a MMSE technique is used, $\{\sigma_5^6, \sigma_6^2\}_{MMSE} = diag\{(S_{\bar{2}}^H S_{\bar{2}} + \sigma^2 I)^{-1}\}$. As stated above, because each STBC block is permutated regardless of the change of an MSE value, $\sigma_5^2 = \sigma_6^2$. When sequential detection is performed layer by layer, the MSE is gradually decremented according to a gain obtained by eliminating the interference from a received signal. Noise power obtained by the sequential signal detection process is $\lambda = \{\lambda_1 = \sigma_3^2, \lambda_2 = \sigma_5^2\}$.

The MSE is rewritten as the following Equation 10.

$$\lambda_l \stackrel{ZF}{=} \min\, diag\{(S_{\bar{k}_l}^H S_{\bar{k}_l})^{-1}\} \quad (10)$$

$$\stackrel{MMSE}{=} \min\, diag\{(S_{\bar{k}_l}^H S_{\bar{k}_l} + \sigma^2 I)^{-1}\}$$

In the above Equation 10, the elements of S are quasi-static channel values predicted by the receiving terminal, and is a constant. If the transmitting terminal assigns and transmits a current block coded signal to a Tx antenna different from a Tx antenna of a previously transmitted signal, a column of a channel matrix H is permutated, such that the position of S elements are varied and thus the MSE calculated by the above Equation 10 is varied also. This implies that the MSE value in the receiving terminal varies according to an antenna transmitting a space-time block coded signal in the transmitting terminal. Under the assumption that channel is quasi-static, that is, a channel state is invariant during some frame time, the receiving terminal calculates an MSE associated with the STBC assignment and feeds back shuffling index information of the MMSE to the transmitting terminal.

For example, when T number of Tx antennas and T/2 number of Rx antennas are present in the L-STBC system, the number of shuffling assignment combinations Q having different MSEs is $$\frac{T!}{2(T/2)!}.$$

When the number of Tx antennas is 4, 6 shuffling assignment combinations of [1 2 3 4], [1 2 4 3], [1 3 2 4], [1 3 4 2], [1 4 2 3], and [1 4 3 2] are produced. For example, the following Table 1 illustrates a shuffling table in a 4×2 system. The following Table 1 will be described in detail. A channel based on a combination can be expressed by the following Equation 11.

TABLE 1

| | Shuffling combination | | | | | |
|---|---|---|---|---|---|---|
| | [1 2 3 4] | [1 2 4 3] | [1 3 2 4] | [1 3 4 2] | [1 4 2 3] | [1 4 3 2] |
| Index q | 1 | 2 | 3 | 4 | 5 | 6 |
| Feedback bits | 001 | 010 | 011 | 100 | 101 | 110 |

$$H_q = HP_q, q \in \{1,2,\ldots,6\} \quad (11)$$

In the above Equation 11, $P_q$ is a column permutation matrix based on Permutation Combination Indexes q, 1~6. The column permutation matrix $P_q$ can be expressed by the following Equation 12.

$$P_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix},\, P_2 = \begin{bmatrix} 1 & 0 & 0 & 0 \\ 0 & 1 & 0 & 0 \\ 0 & 0 & 0 & 1 \\ 0 & 0 & 1 & 0 \end{bmatrix}, \quad (12)$$

$$P_3 = \begin{bmatrix} 1 & 0 & 0 & 0 \\ 0 & 0 & 1 & 0 \\ 0 & 1 & 0 & 0 \\ 0 & 0 & 0 & 1 \end{bmatrix},\, P_4 = \begin{bmatrix} 1 & 0 & 0 & 0 \\ 0 & 0 & 0 & 1 \\ 0 & 1 & 0 & 0 \\ 0 & 0 & 1 & 0 \end{bmatrix},$$

$$P_5 = \begin{bmatrix} 1 & 0 & 0 & 0 \\ 0 & 0 & 1 & 0 \\ 0 & 0 & 0 & 1 \\ 0 & 1 & 0 & 0 \end{bmatrix},\, P_6 = \begin{bmatrix} 1 & 0 & 0 & 0 \\ 0 & 0 & 0 & 1 \\ 0 & 0 & 1 & 0 \\ 0 & 1 & 0 & 0 \end{bmatrix}$$

In the above Equation 12, it is assumed that a new channel matrix in which a row is permutated by a permutation matrix $P_q$ is $H_q$. A new channel matrix $S_q$ can be produced from $H_q$. When the transmitting terminal transmits signals in a q-th index combination, and the receiving terminal performs a V-BLAST detection operation on an l-th layer, the MSE can be expressed by the following Equation 13.

$$\lambda_{q,l} \stackrel{ZF}{=} \min[diag\{(S_{q,\bar{k}_l}^H S_{q,\bar{k}_l})^{-1}\}] \quad (13)$$

$$\stackrel{MMSE}{=} \min[diag\{(S_{q,\bar{k}_l}^H S_{q,\bar{k}_l} + \sigma^2 I)^{-1}\}],\, q \in \{1, 2, \ldots, Q\},$$

$$l \in \{0, 1, \ldots, L-1\}$$

In the above Equation 13, L=T/B, L is the number of layers, T is the number of Tx antennas, B is an STBC block size, and Q is the number of shuffling combinations.

An optimum shuffling index can be obtained from the following Equation 14.

select antenna shuffling index $q$ s.t. (14)

$$\min_q \left( \max_{\lambda_l} [\min[diag\{(S_{q,\bar{k}_l}^H S_{q,\bar{k}_l})^{-1}\}]] \right),\, (ZF)\, \forall\, q, \forall\, l.$$

$$\min_q \left( \max_{\lambda_l} [\min[diag\{(S_{q,\bar{k}_l}^H S_{q,\bar{k}_l} + \sigma^2 I)^{-1}\}]] \right),$$

$(MMSE)\, \forall\, q, \forall\, l.$

According to the above Equation 14, an algorithm for obtaining optimal shuffling information in the receiving terminal can be divided into two steps.

Step 1. The receiving terminal estimates a channel matrix S of the above Equation 2.

Step 2. q and l values which can satisfy the above Equation 14 with respect to all of the shuffling combinations q and all of the layers l according to the number of the transmit/receive antennas are retrieved.

On the basis of the above Equation 14, the receiving terminal in accordance with a first embodiment of the present invention detects signals according to all of the shuffling combinations q of all of the layers l. However, when a process for eliminating each layer's interference component is repeated in the BLAST technique for sequentially eliminating an interference component from a received signal and detecting a true signal, a mean value of MSE values is reduced.

In a second embodiment, the MMSE between all of the layers are not produced. The quasi-optimum shuffling information method for obtaining only the MMSE of a first layer is expressed by the following Equation 15.

$$\text{select antenna shuffling index } q \text{ s.t.} \quad (15)$$

$$\min_q \left( \min \left[ diag \left\{ \left( S_{q,\bar{k}_0}^H S_{q,\bar{k}_0} \right)^{-1} \right\} \right] \right), (ZF) \forall q.$$

$$\min_q \left( \min \left[ diag \left\{ \left( S_{q,\bar{k}_0}^H S_{q,\bar{k}_0} + \sigma^2 I \right)^{-1} \right\} \right] \right), (MMSE) \forall q.$$

It can be seen that the number of computations required for the above Equation 15 is less than that of the above Equation 14.

(2) Number of Shuffling Combinations and Table Generation Method

When the number of Tx antennas is T, the number of shuffling combinations are T!. That is, when the number of Tx antennas is 4, the total number of shuffling combinations is 4!, that is, [1 2 3 4], [1 2 4 3], [1 3 2 4] ... [4 3 1 2], and [4 3 2 1].

The number of combinations is reduced according to the following characteristics associated with the MSE.

Characteristic 1: Permutated STBC blocks have identical MSE values.

For example, when antennas for STBC signals are expressed using parentheses in the shuffling information [1 2 3 4], an MSE value of [(1 2) (3 4)] is identical with that of [(3 4) (1 2)].

Characteristic 2: Even when symbols within all of the STBC blocks are simultaneously permutated, MSE values are identical.

For example, when antennas for STBC signals are expressed using parentheses in the shuffling information [1 2 3 4], an MSE value of [(1 2) (3 4)] is identical with that of [(2 1) (4 3)].

The total number of shuffling combinations Q is $$\frac{T!}{2(T/2)!}.$$

For example, when the number of Tx antennas is 4, the number of shuffling combinations is 6 as illustrated in the above Table 1. The receiving terminal generates an index corresponding to each combination in the form of a table to feed back the shuffling information as illustrated in the above Equations 14 and 15, and transmits feedback bits corresponding to the index. This can be easily understood from the above Table 1.

When the number of Tx antennas is 4, the number of MSE combinations is 6. However, when the number of Tx antennas increases, the number of feedback bit s is $\log_2 Q$. That is, the number of MSE combinations is 60 when the number of Tx antennas is 6, and the number of MSE combinations is 840 when the number of Tx antennas is 8. For example, a case where the receiving terminal performs a feedback operation in a 6×3 system will be described with reference to the following Table 2.

TABLE 2

| Shuffling combination | | | | | | | | | | | |
|---|---|---|---|---|---|---|---|---|---|---|---|
| [1 2 3 4 5 6] | [1 2 3 4 6 5] | [1 2 4 3 5 6] | [1 2 4 3 6 5] | [1 2 3 5 4 6] | [1 2 3 5 6 4] | [1 2 5 3 4 6] | [1 2 5 3 6 4] | [1 2 3 6 4 5] | [1 2 3 6 5 4] | [1 2 6 3 4 5] | [1 2 6 3 5 4] |

| Index q | 1 | 2 | 3 | 4 | 5 | 6 | 7 | 8 | 9 | 10 | 11 | 12 |

| Shuffling combination | | | | | | | | | | | |
|---|---|---|---|---|---|---|---|---|---|---|---|
| [1 3 2 4 5 6] | [1 3 2 4 6 5] | [1 3 4 2 5 6] | [1 3 4 2 6 5] | [1 3 2 5 4 6] | [1 3 2 5 6 4] | [1 3 5 2 4 6] | [1 3 5 2 6 4] | [1 3 2 6 4 5] | [1 3 2 6 5 4] | [1 3 6 2 5 4] | [1 3 6 2 4 5] |

| Index q | 13 | 14 | 15 | 16 | 17 | 18 | 19 | 20 | 21 | 22 | 23 | 24 |

| Shuffling combination | | | | | | | | | | | |
|---|---|---|---|---|---|---|---|---|---|---|---|
| [1 4 2 3 5 6] | [1 4 2 3 6 5] | [1 4 3 2 5 6] | [1 4 3 2 6 5] | [1 4 2 5 3 6] | [1 4 2 5 6 3] | [1 4 5 2 3 6] | [1 4 5 2 6 3] | [1 4 2 6 3 5] | [1 4 2 6 5 3] | [1 4 6 2 3 5] | [1 4 6 2 5 3] |

| Index q | 25 | 26 | 27 | 28 | 29 | 30 | 31 | 32 | 33 | 34 | 35 | 36 |

TABLE 2-continued

| | Shuffling combination | | | | | | | | | | | |
|---|---|---|---|---|---|---|---|---|---|---|---|---|
| | [1 5 2 3 4 6] | [1 5 2 3 6 4] | [1 5 3 2 4 6] | [1 5 3 2 6 4] | [1 5 2 4 3 6] | [1 5 2 4 6 3] | [1 5 4 2 3 6] | [1 5 4 2 6 3] | [1 5 2 6 3 4] | [1 5 2 6 4 3] | [1 5 6 2 3 4] | [1 5 6 2 4 3] |
| Index q | 37 | 38 | 39 | 40 | 41 | 42 | 43 | 44 | 45 | 46 | 47 | 48 |

| | Shuffling combination | | | | | | | | | | | |
|---|---|---|---|---|---|---|---|---|---|---|---|---|
| | [1 6 2 3 4 5] | [1 6 2 3 5 4] | [1 6 3 2 4 5] | [1 6 3 2 5 4] | [1 6 2 4 3 5] | [1 6 2 4 5 3] | [1 6 4 2 3 5] | [1 6 4 2 5 3] | [1 6 2 5 3 4] | [1 6 2 5 4 3] | [1 6 5 2 3 4] | [1 6 5 2 4 3] |
| Index q | 49 | 50 | 51 | 52 | 53 | 54 | 55 | 56 | 57 | 58 | 59 | 60 |

The present invention can partially compare MSE combinations by taking into account the complexity of hardware or amount of the feedback bits.

As illustrated in the above Table 2, when the number of Tx antennas is 6, the total number of shuffling combinations is 60. Accordingly, when the transmitting and receiving terminals preset the number of feedback bits to 3 according to a negotiation, only combinations based on Indexes 1 to 8 are compared, such that the system's computational load can be significantly reduced.

(3) Antenna Shuffling in an L-STBC-Based Transmitting Terminal

As stated above, the transmitting terminal receives shuffling index information fed back from the receiving terminal and retrieves shuffling combination information corresponding to the index information from a stored table. The shuffling unit 308 illustrated in FIG. 3 receives a transmission data stream, combines signals according to the shuffling combination information, assigns the combined signals to antennas, and transmits the combined signals to the receiving terminal.

A shuffling information acquisition method in a 4×2 L-STBC MIMO system in accordance with a third embodiment of the present invention will be described.

A method for acquiring optimum or quasi-optimum shuffling information in the receiving terminal has been described with reference to the above Equations 14 and 15. A method for acquiring shuffling information which requires fewer computations than the above Equations 14 and 15 will be described.

First, $\lambda \propto |h_{1,1}h_{2,2} - h_{1,2}h_{2,1} + h_{1,3}h_{2,4} - h_{1,4}h_{2,3}|$ is induced from the above Equation 4, and the following Equation 16 can be defined from the above Equation 11.

$$H_q = HP_q = [H_{q,1} H_{q,2}] q \in \{1, 2, \ldots 6\} \quad (16)$$

In the above Equation 16, a matrix H has a size of 2×2, and a matrix $P_q$ has a size of 4×4. Accordingly, in the induced $\lambda \propto |h_{1,1}h_{2,2} - h_{1,2}h_{2,1} + h_{1,3}h_{2,4} - h_{1,4}h_{2,3}|$, $h_{1,1}h_{2,2} - h_{1,2}h_{2,1}$ can be distinguished by means of $H_{q,1}$ and $h_{1,3}h_{2,4} - h_{1,4}h_{2,3}$ can be distinguished by means of $H_{q,2}$. When T=4, the above Equation 15 can be simply expressed by the following Equation 17.

$$\text{select antenna shuffling index } q \text{ s.t.} \quad (17)$$
$$\min_q (\text{abs}[det\{(H_{q,1}) + det\{(H_{q,2})\}]), (ZF) \forall q.$$

In the above Equation 17, abs denotes an absolute value, det denotes determinant, and ZF denotes zero forcing.

When the above Equation 17 is applied to the 4×2 L-STBC MIMO system, an inverse matrix of the matrix in the above Equation 15 and a matrix product do not need to be calculated. That is, the system performs approximately 170 complex number computations when using the above Equation 15, but performs 10 complex number computations when using the above Equation 17.

Next, a method for acquiring shuffling information in the receiving terminal of the L-STBC MIMO system in accordance with an embodiment of the present invention will be described with reference to FIG. 4.

FIG. 4 is a flow chart illustrating a shuffling information acquisition process performed by the receiving terminal of the L-STBC system in accordance with the embodiment of the present invention.

Referring to FIG. 4, the receiving terminal receives L-STBC signals from the transmitting terminal through Rx antennas in step 402, and proceeds to step 404. The receiving terminal calculates a weighting matrix based on a ZF or MMSE scheme as illustrated in the above Equation 4 in step 404, and proceeds to step 406. The receiving terminal selects a layer with the MMSE and all of the q values using the above Equation 13 in relation to an estimated channel matrix (S) in step 406, and proceeds to step 408. The receiving terminal estimates and detects the STBC symbols of the selected layer using the above Equation 14 or 15 in step 408, and proceeds to step 410. Using the above Equation 7, the receiving terminal eliminates an interference component from a received signal detected by the above Equation 6 in step 410, and proceeds to step 412. The receiving terminal corrects a channel to set, to a vector of 0, a channel state value of the received signal from which the interference component is eliminated as illustrated in the above Equation 8 in step 412, and proceeds to step 414. The receiving terminal obtains a new weighting matrix to estimate and detect STBC symbols of a remaining layer in step 414, and repeats the process from step 404. The receiving terminal decides a shuffling combination satisfying an optimum or quasi-optimum MSE value and feeds back the decided shuffling combination to the transmitting terminal.

An example of comparing a simulation result in accordance with an embodiment of the present invention and a conventional simulation result will be described with reference to FIG. 5.

Figure 5:
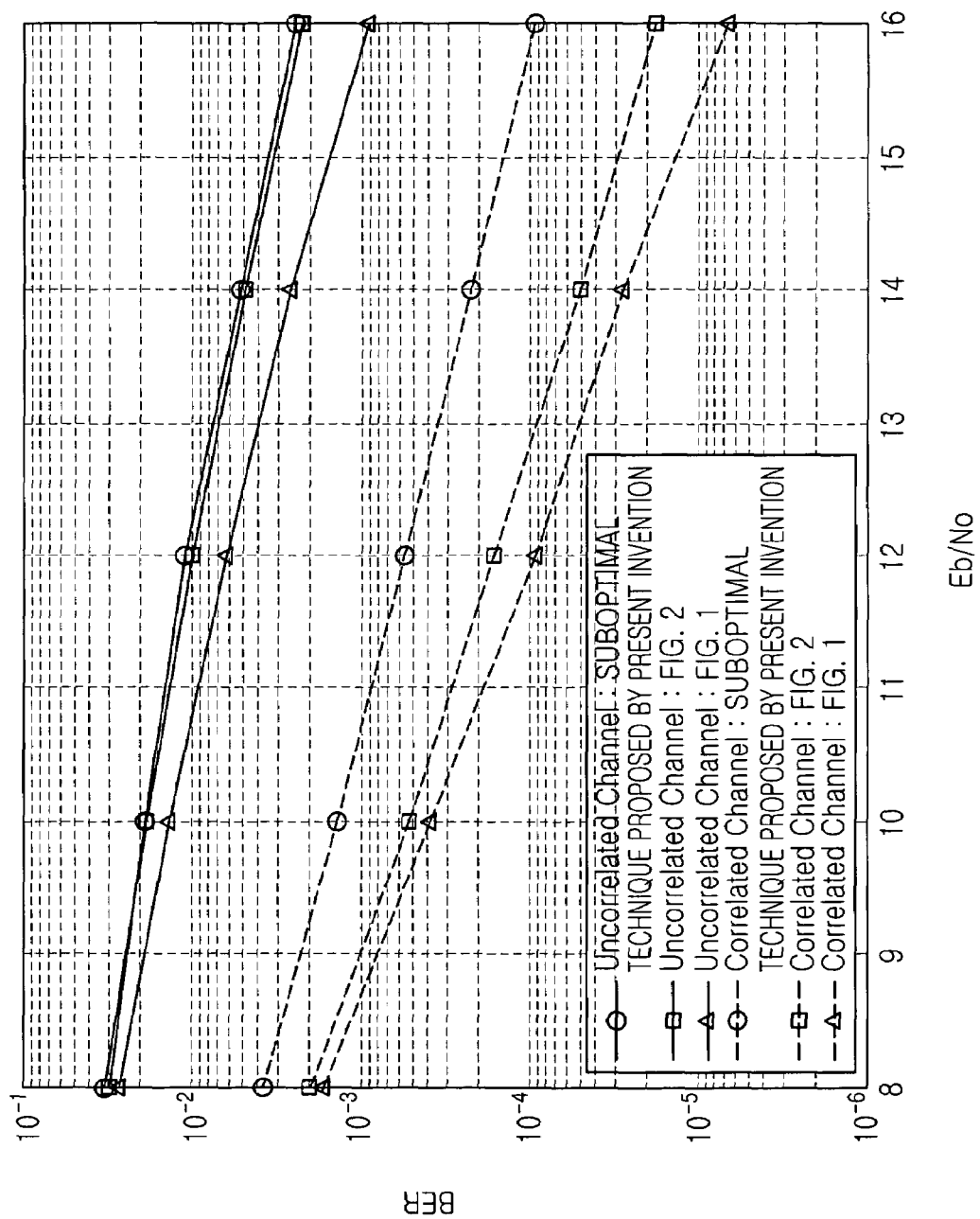
FIG. 5 is a graph illustrating a comparison result between an L-STBC technique in accordance with an embodiment of the present invention and a conventional L-STBC technique.

FIG. 5 is a graph illustrating a comparison result between an L-STBC technique in accordance with an embodiment of the present invention and a conventional L-STBC technique.

A simulation environment of FIG. 5 is as follows.
(1) Number of transmit/receive antenna
(2) s: 4×2
(2) Modulation mode: QPSK
(3) Channel code: none
(4) Channel: correlated/uncorrelated Rayleigh fading channel
(5) Transmitting terminal: 2×2 STBC use
(6) Receiving terminal: V-BLAST detection (MMSE scheme)

Figure 1:
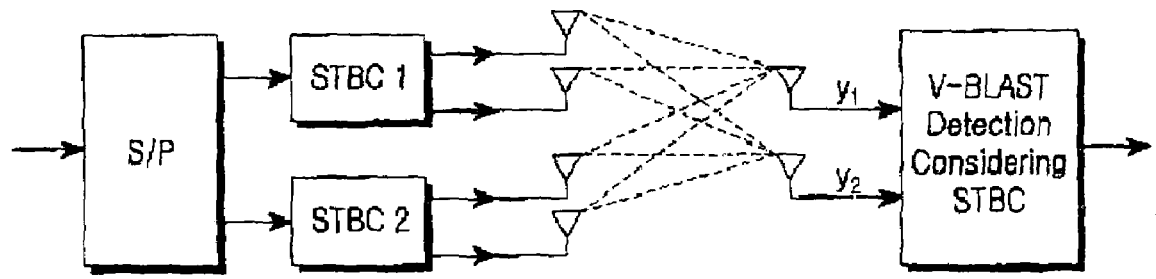
FIG. 1 is a block diagram illustrating a conventional layered space-time block coding (L-STBC) system.
Figure 2:
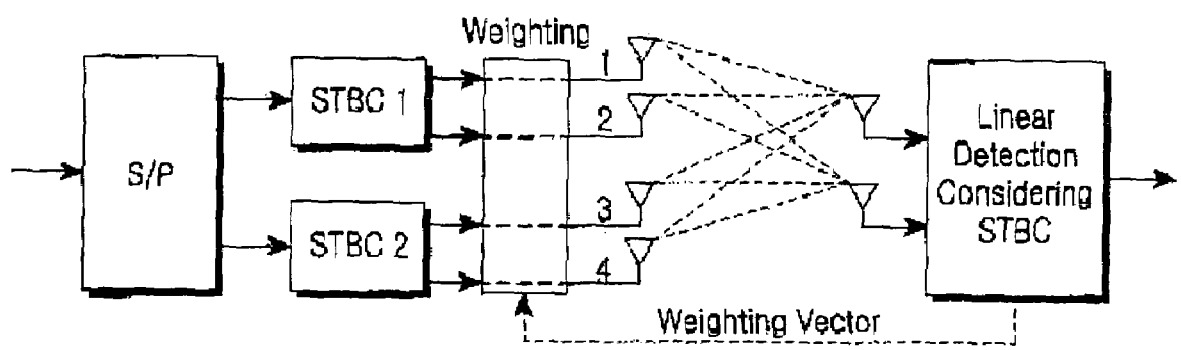
FIG. 2 is a block diagram illustrating a conventional double space-time transmit diversity (DSTTD) system for feeding back a weighting matrix.

Referring to FIG. 5 illustrating correlated or uncorrelated channels indicated by the dashed or solid line, it can be seen that the technique proposed by the present invention has excellent performance or similar performance while reducing the number of computations as compared with the techniques of FIGS. 1 and 2.

As stated above, a receiving terminal transmits antenna shuffling combination information to a transmitting terminal in accordance with the present invention. The transmitting terminal shuffles signals to be transmitted in response to the shuffling combination information. Accordingly, a correlation between channels is lower, and thus performance can be improved. Moreover, the receiving terminal can reduce a system load by reducing an amount of information fed back to the transmitting terminal. More specifically, optimum shuffling information applicable to a 4×2 L-STBC system can be efficiently acquired.

Although the preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method for feeding back antenna shuffling information of transmitted signals in a multiple-input multiple-output (MIMO) system, comprising the steps of:
   receiving, through two reception antennas, signals transmitted from four transmit antennas;
   computing mean square error values of the received signals in relation to antenna shuffling information indices of the transmitted signals; and
   feeding back an index of an antenna shuffling having a minimum mean square error value from among the mean square error values,
   wherein the index of the antenna shuffling is determined using channel matrix S, where $$S = \begin{bmatrix} h_{1,1} & h_{1,2} & h_{1,3} & h_{1,4} \\ h_{1,2}^* & -h_{1,1}^* & h_{1,4}^* & -h_{1,3}^* \\ h_{2,1} & h_{2,2} & h_{2,3} & h_{2,4} \\ h_{2,2}^* & -h_{2,1}^* & h_{2,4}^* & -h_{2,3}^* \end{bmatrix}, \text{ and}$$

$h_{i,j}$ is a channel gain value between a j-th Tx antenna and an i-th Rx antenna.

2. The method of claim 1, wherein the mean square error values are computed in relation to a predetermined number of antenna shuffling information indices from among the antenna shuffling information indices.

3. The method of claim 1, wherein the number of antenna shuffling information indices are determined based on a number of transmit antennas.

4. The method of claim 1, wherein the minimum mean square error value associated with the antenna shuffling information indices of the transmitted signals is determined by:

$$\lambda_{q,l} \stackrel{ZF}{=} \min[diag\{(S_{q,\bar{k}_l}^H S_{q,\bar{k}_l})^{-1}\}]$$
$$\stackrel{MMSE}{=} \min[diag\{(S_{q,\bar{k}_l}^H S_{q,\bar{k}_l} + \sigma^2 I)^{-1}\}],$$
$$q \in \{1, 2, \ldots, Q\}, l \in \{0, 1, \ldots, L-1\}$$

where diag denotes a diagonal matrix, S denotes the channel matrix, L=T/B, L denotes the number of layers, T denotes the number of transmit antennas, B denotes an STBC block size, Q denotes the number of combinations of the transmitted signals, H denotes a Hermitian transpose, ZF denotes zero forcing, and MMSE denotes a minimum mean square error.

5. The method of claim 1, wherein the index of the antenna shuffling having the minimum mean square error value from among the computed mean square error values is determined by:

select antenna shuffling index $q$ s.t.

$$\min_q(\min[diag\{(S_{q,\bar{k}_0}^H S_{q,\bar{k}_0})^{-1}\}]), (ZF) \forall q$$
$$\min_q(\min[diag\{(S_{q,\bar{k}_0}^H S_{q,\bar{k}_0} + \sigma^2 I)^{-1}\}]), (MMSE) \forall q$$

where diag denotes a diagonal matrix, S denotes the channel matrix, ZF denotes zero forcing, and MMSE denotes a minimum mean square error.

6. The method of claim 1, wherein the index of the antenna shuffling having the minimum mean square error value from among the computed mean square error values is determined by:

select antenna shuffling index $q$ s.t.

$$\min_q\left(\max_{\lambda_l}[\min[diag\{(S_{q,\bar{k}_l}^H S_{q,\bar{k}_l})^{-1}\}]]\right), (ZF) \forall q, \forall l$$
$$\min_q\left(\max_{\lambda_l}[\min[diag\{(S_{q,\bar{k}_l}^H S_{q,\bar{k}_l} + \sigma^2 I)^{-1}\}]]\right), (MMSE) \forall q, \forall l$$

where diag denotes a diagonal matrix, S denotes the channel matrix, ZF denotes zero forcing, and MMSE denotes a minimum mean square error.

7. The method of claim 6, wherein q denotes a value stored in advance in transmitting and receiving terminals, and denotes an index value of antenna shuffling information of the transmitted signals.

8. The method of claim 1, wherein an index of combination information of the transmitted signals is determined by:

select antenna shuffling index $q$ s.t.

$$\min_q(abs[det\{(H_{q,1})+det\{(H_{q,2})\}]), (ZF) \forall q$$

where abs denotes an absolute value, det denotes determinant, and ZF denotes zero forcing.

9. An apparatus for transmitting signals in a multiple-input multiple-output (MIMO) system, comprising:

a shuffling unit for receiving an antenna shuffling index of transmitted signals from a receiving terminal and combining signals to be transmitted according to the antenna shuffling index and assigning the combined signals to antennas; and a MIMO detector for computing mean square error values in relation to antenna shuffling information indices of the transmitted signals, and feeding back an index of an antenna shuffling having a minimum mean square error value from among the mean square error values wherein the index of the antenna shuffling is determined using channel matrix S, where $$S = \begin{bmatrix} h_{1,1} & h_{1,2} & h_{1,3} & h_{1,4} \\ h_{1,2}^* & -h_{1,1}^* & h_{1,4}^* & -h_{1,3}^* \\ h_{2,1} & h_{2,2} & h_{2,3} & h_{2,4} \\ h_{2,2}^* & -h_{2,1}^* & h_{2,4}^* & -h_{2,3}^* \end{bmatrix}, \text{ and}$$

$h_{i,j}$ is a channel gain value between a j-th Tx antenna and an i-th Rx antenna.

10. The apparatus of claim 9, further comprising a memory for storing combination information of the transmitted signals corresponding to the antenna shuffling index in advance in a transmitting terminal.

11. The apparatus of claim 9, wherein the minimum mean square error value associated with the antenna shuffling information indices of the transmitted signals is determined by:

$$\lambda_{q,l} \stackrel{ZF}{=} \min\left[diag\left\{\left(S_{q,\bar{k}_l}^H S_{q,\bar{k}_l}\right)^{-1}\right\}\right]$$

$$\stackrel{MMSE}{=} \min\left[diag\left\{\left(S_{q,\bar{k}_l}^H S_{q,\bar{k}_l} + \sigma^2 I\right)^{-1}\right\}\right],$$

$$q \in \{1, 2, \ldots, Q\}, l \in \{0, 1, \ldots, L-1\}$$

where diag denotes a diagonal matrix, S denotes the channel matrix, L=T/B, L denotes the number of layers, T denotes the number of transmit antennas, B denotes an STBC block size, Q denotes the number of combinations of the transmitted signals, H denotes a Hermitian transpose, ZF denotes zero forcing, and MMSE denotes a minimum mean square error.

12. The apparatus of claim 9, wherein the index of the antenna shuffling having the minimum mean square error value from among the computed mean square error values is determined by:

select antenna shuffling index $q$ s.t.

$$\min_q \left(\min\left[diag\left\{\left(S_{q,\bar{k}_0}^H S_{q,\bar{k}_0}\right)^{-1}\right\}\right]\right), (ZF) \forall\, q$$

$$\min_q \left(\min\left[diag\left\{\left(S_{q,\bar{k}_0}^H S_{q,\bar{k}_0} + \sigma^2 I\right)^{-1}\right\}\right]\right), (MMSE) \forall\, q$$

where diag denotes a diagonal matrix, S denotes the channel matrix, ZF denotes zero forcing, MMSE denotes a minimum mean square error, and q denotes the number of combinations of the transmitted signals.

13. The apparatus of claim 9, wherein the index of the antenna shuffling having the minimum mean square error value from among the computed mean square error values is determined by:

select antenna shuffling index $q$ s.t.

$$\min_q \left(\max_{\lambda_l}\left[\min\left[diag\left\{\left(S_{q,\bar{k}_l}^H S_{q,\bar{k}_l}\right)^{-1}\right\}\right]\right]\right), (ZF) \forall\, q, \forall\, l$$

$$\min_q \left(\max_{\lambda_l}\left[\min\left[diag\left\{\left(S_{q,\bar{k}_l}^H S_{q,\bar{k}_l} + \sigma^2 I\right)^{-1}\right\}\right]\right]\right), (MMSE) \forall\, q, \forall\, l$$

where diag denotes a diagonal matrix, S denotes the channel matrix, ZF denotes zero forcing, MMSE denotes a minimum mean square error, q denotes the number of combinations of the transmitted signals, and l denotes the number of layers determined by the number of transmit antennas and the number of the receive antennas.

14. The apparatus of claim 9, wherein an index of antenna shuffling information of the transmitted signals is determined by:

select antenna shuffling index $q$ s.t.

$$\min_q \{abs[det(H_{q,1}) + det(H_{q,2})]\}, (ZF) \forall\, q$$

where abs denotes an absolute value, det denotes determinant, ZF denotes zero forcing, and q denotes the number of combinations of the transmitted signals.

* * * * *